(12) United States Patent
Okamoto et al.

(10) Patent No.: US 10,016,718 B2
(45) Date of Patent: Jul. 10, 2018

(54) GAS ABSORBING AND REGENERATING APPARATUS AND METHOD FOR OPERATING SAME

(71) Applicant: MITSUBISHI HEAVY INDUSTRIES, LTD., Tokyo (JP)

(72) Inventors: Shinichi Okamoto, Tokyo (JP); Masaru Chiyomaru, Tokyo (JP); Hiroshi Tanaka, Tokyo (JP); Hiromitsu Nagayasu, Tokyo (JP); Takuya Hirata, Tokyo (JP); Tsuyoshi Oishi, Tokyo (JP); Daisuke Shimada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 425 days.

(21) Appl. No.: 14/898,855

(22) PCT Filed: Jan. 21, 2015

(86) PCT No.: PCT/JP2015/051552
§ 371 (c)(1),
(2) Date: Dec. 16, 2015

(87) PCT Pub. No.: WO2015/115275
PCT Pub. Date: Aug. 6, 2015

(65) Prior Publication Data
US 2016/0114283 A1    Apr. 28, 2016

(30) Foreign Application Priority Data

Jan. 31, 2014 (JP) ................................ 2014-017839

(51) Int. Cl.
*B01D 53/14* (2006.01)
*B01D 53/52* (2006.01)
(Continued)

(52) U.S. Cl.
CPC ......... *B01D 53/1425* (2013.01); *B01D 53/14* (2013.01); *B01D 53/1412* (2013.01);
(Continued)

(58) Field of Classification Search
CPC ............ G01R 31/3662; G01R 31/3665; G01R 31/3696; Y02C 10/06; B01D 2252/204;
(Continued)

(56) References Cited

U.S. PATENT DOCUMENTS

| | | | |
|---|---|---|---|
| 2011/0192215 A1 | 8/2011 | Finlay | |
| 2012/0167760 A1* | 7/2012 | Muraoka | B01D 53/1412 95/8 |
| 2012/0245737 A1 | 9/2012 | Liu et al. | |

FOREIGN PATENT DOCUMENTS

| | | |
|---|---|---|
| JP | 3-193116 A | 8/1991 |
| JP | 2011-157486 A | 8/2011 |

(Continued)

OTHER PUBLICATIONS

Office Action dated Sep. 28, 2017, issued in counterpart European Application No. 15743873.0. (5 pages).

(Continued)

*Primary Examiner* — Cabrena Holecek
(74) *Attorney, Agent, or Firm* — Westerman, Hattori, Daniels & Adrian, LLP

(57) ABSTRACT

When $CO_2$ gas is absorbed by using an absorbent circulating in an absorption tower and an absorbent regeneration tower, a first sampling part at which a lean solution sample is collected in the vicinity of an inlet for a lean solution supply line in the absorption tower, a second sampling part at which a rich solution sample is collected in the vicinity of an outlet for a rich solution supply line in the absorption tower, and an analyzing device which analyzes the collected lean solution sample and rich solution sample are provided; the (Continued)

lean solution sample at the first sampling part and the rich solution sample at the second sampling part are collected, respectively, in the same time period, and concentrations of $CO_2$ gas in the lean solution sample and the rich solution sample are measured, and then the gas absorbing/regenerating operation is controlled based on measured results.

8 Claims, 3 Drawing Sheets

(51) Int. Cl.
 *B01D 53/62* (2006.01)
 *B01D 53/77* (2006.01)
 *B01D 53/30* (2006.01)
(52) U.S. Cl.
 CPC ..... *B01D 53/1475* (2013.01); *B01D 53/1493* (2013.01); *B01D 53/30* (2013.01); *B01D 53/52* (2013.01); *B01D 53/62* (2013.01); *B01D 53/77* (2013.01); *B01D 2252/204* (2013.01); *B01D 2257/504* (2013.01); *B01D 2258/0283* (2013.01); *Y02C 10/06* (2013.01)
(58) Field of Classification Search
 CPC ...... B01D 2257/504; B01D 2258/0283; B01D 53/14; B01D 53/1412; B01D 53/1425; B01D 53/1475; B01D 53/1493; B01D 53/30; B01D 53/52; B01D 53/62; B01D 53/77; H01M 10/0583; H01M 10/4285
 See application file for complete search history.

(56) References Cited

FOREIGN PATENT DOCUMENTS

| JP | 2012-35214 A | 2/2012 |
|----|--------------|--------|
| JP | 2012-110836 A | 6/2012 |
| JP | 2012-110841 A | 6/2012 |
| JP | 2012-152731 A | 8/2012 |
| JP | 2012-254390 A | 12/2012 |

OTHER PUBLICATIONS

Office Action dated Sep. 26, 2017, issued in counterpart Japanese Application No. 2014-017839, with English machine translation. (9 pages).

Extended (supplementary) European Search Report dated Sep. 20, 2016, issued in counterpart European Patent Application No. 15743873.0. (8 pages).

International Search Report dated Apr. 14, 2015, issued in counterpart application No. PCT/JP2015/051552 (3 pages), w/English translation.

Written Opinion dated Apr. 14, 2015, issued in counterpart application No. PCT/JP2015/051552 (10 pages), w/English translation.

\* cited by examiner

GAS ABSORBING AND REGENERATING APPARATUS AND METHOD FOR OPERATING SAME

FIELD

The present invention relates to a gas absorbing and regenerating apparatus and a method for operating same.

BACKGROUND

Recently, a greenhouse effect due to $CO_2$ is pointed out as a cause of global heating, and countermeasures for this have rapidly become imperative across the world for preserving the earth environment. Every human activity field in which fossil fuel burns generates $CO_2$ and demand for $CO_2$ emission control becomes greater. With this, a method for removing and recovering $CO_2$ in flue gas by bringing the flue gas of a boiler into contact with an amine $CO_2$ absorbent and a method for storing recovered $CO_2$ without releasing it to atmosphere are intensively studied for power generating facilities such as a thermal power plant in which a large amount of fossil fuel is used.

As a step of removing/recovering $CO_2$ from the flue gas by using such $CO_2$ absorbent, a step of bringing the flue gas into contact with the $CO_2$ absorbent in an absorber and a step of heating the absorbent which absorbs $CO_2$ in a regenerator to liberate $CO_2$ and, regenerating the absorbent and circulating the regenerated absorbent in the absorber again to reuse are adopted (for example, refer to Patent Literature 1).

Also, in addition to a case in which $CO_2$ in the flue gas is recovered, for example, in a case in which $H_2S$ in carbon gasification gas is recovered by a gasification gas purifying system, a method for absorbing $H_2S$ in the carbon gasification gas in the absorber and regenerating the absorbent in the regenerator to circulate and reuse is adopted (for example, refer to Patent Literature 2).

CITATION LIST

Patent Literature

Patent Literature 1: Japanese Laid-open Patent Publication No. 3-193116
Patent Literature 2: Japanese Laid-open Patent Publication No. 2011-157486

SUMMARY

Technical Problem

In a gas absorbing process of an absorbing and regenerating method, it is required to find a preferred operational condition from an aspect of required gas absorption performance and energy reduction required for the process; however, an efficient condition is not yet established.

In operation of a recovery unit which recovers $H_2S$ or $CO_2$ in gas, operation to achieve the required absorption performance of absorbed gas (recovered amount and absorption rate of $H_2S$ or $CO_2$) and reduce energy to minimize heat quantity of saturated water vapor and the like supplied to a reboiler of a regenerator is desired.

The present invention is achieved in view of the above-described problem and an object thereof is to provide a gas absorbing and regenerating apparatus capable of achieving the required absorption performance of the absorbed gas and minimizing the heat quantity of the saturated water vapor and the like supplied to the reboiler of the regenerator and a method for operating same.

Solution to Problem

According to a first aspect of the present invention to solve the above mentioned problems, there is provided a gas absorbing and regenerating apparatus, comprising an absorber which absorbs absorbed gas from introduced gas containing the absorbed gas by using an absorbent circulating in a closed system, an absorbent regenerator which releases the absorbed gas from the absorbent which absorbs the absorbed gas in the absorber, a rich solution supply line which draws off the absorbent which absorbs the absorbed gas in the absorber from the absorber as rich solution and introduces the absorbent into the absorbent regenerator, a lean solution supply line which draws off the absorbent regenerated in the absorbent regenerator from the absorbent regenerator as lean solution and introduces the absorbent into the absorber, a first sampling part at which a lean solution sample is collected in the vicinity of an inlet for the lean solution supply line in the absorber, a second sampling part at which a rich solution sample is collected in the vicinity of an outlet for the rich solution supply line in the absorber, and an analyzing device which analyzes the collected lean solution sample and rich solution sample, wherein the gas absorbing and regenerating apparatus collects the lean solution sample at the first sampling part and the rich solution sample at the second sampling part, respectively, in the same time period, and measures concentrations of the absorbed gas in the lean solution sample and the rich solution sample, and then controls an operational status of gas absorption/regeneration based on the measured results.

According to a second aspect of the present invention, in the first aspect, there is provided the gas absorbing and regenerating apparatus, wherein concentrations of the absorbent in the lean solution sample and the rich solution sample are measured by the analyzing device.

According to a third aspect of the present invention, in the first and second aspects, there is provided the gas absorbing and regenerating apparatus, comprising a gas discharge line which discharges discharge gas obtained by removal of the absorbed gas from a top of the absorber and a third sampling part at which a gas sample is collected in the vicinity of an outlet for the gas discharge line in the absorber, wherein the gas absorbing and regenerating apparatus collects the gas at the third sampling part in the same time period as the collection of the lean solution sample and the rich solution sample, and measures a concentration of the absorbent entrained in the discharge gas, and then controls gas absorbing and regenerating operation based on the measured result.

According to a fourth aspect of the present invention, there is provided a method for operating a gas absorbing and regenerating apparatus using the gas absorbing and regenerating apparatus according to any one of the first aspect to the third aspect, the method comprising, when the introduced gas is boiler flue gas containing $CO_2$ and the absorbent is an amine absorbent, simultaneously figuring out $CO_2$ concentrations of both the lean solution and the rich solution and a concentration of the amine absorbent of at least one or both of the lean solution and the rich solution, and decreasing heat load in a reboiler when a $CO_2$ recovery rate by absorption satisfies a predetermined recovery rate.

According to a fifth aspect of the present invention, there is provided a method for operating a gas absorbing and regenerating apparatus using the gas absorbing and regenerating apparatus according to any one of the first aspect to the third aspect, the method comprising, when the introduced gas is gasification gas containing $H_2S$ and $CO_2$ and the absorbent is an amine absorbent, simultaneously figuring out $CO_2$ concentrations of both the lean solution and the rich solution and a concentration of the amine absorbent of at least one or both of the lean solution and the rich solution, and minimizing an absorbed amount of $CO_2$ when a concentration of $H_2S$ satisfies a predetermined value.

Advantageous Effects of Invention

According to the present invention, it is possible to achieve required absorption performance of absorbed gas and minimize heat quantity of saturated water vapor and the like supplied to a reboiler of a regenerator.

DESCRIPTION OF EMBODIMENTS

Preferred embodiments of the present invention are hereinafter described in detail with reference to the attached drawings. Meanwhile, the present invention is not limited by the embodiments; when there is a plurality of embodiments, combinations of the embodiments are also included in the present invention.

First Embodiment

Figure 1:
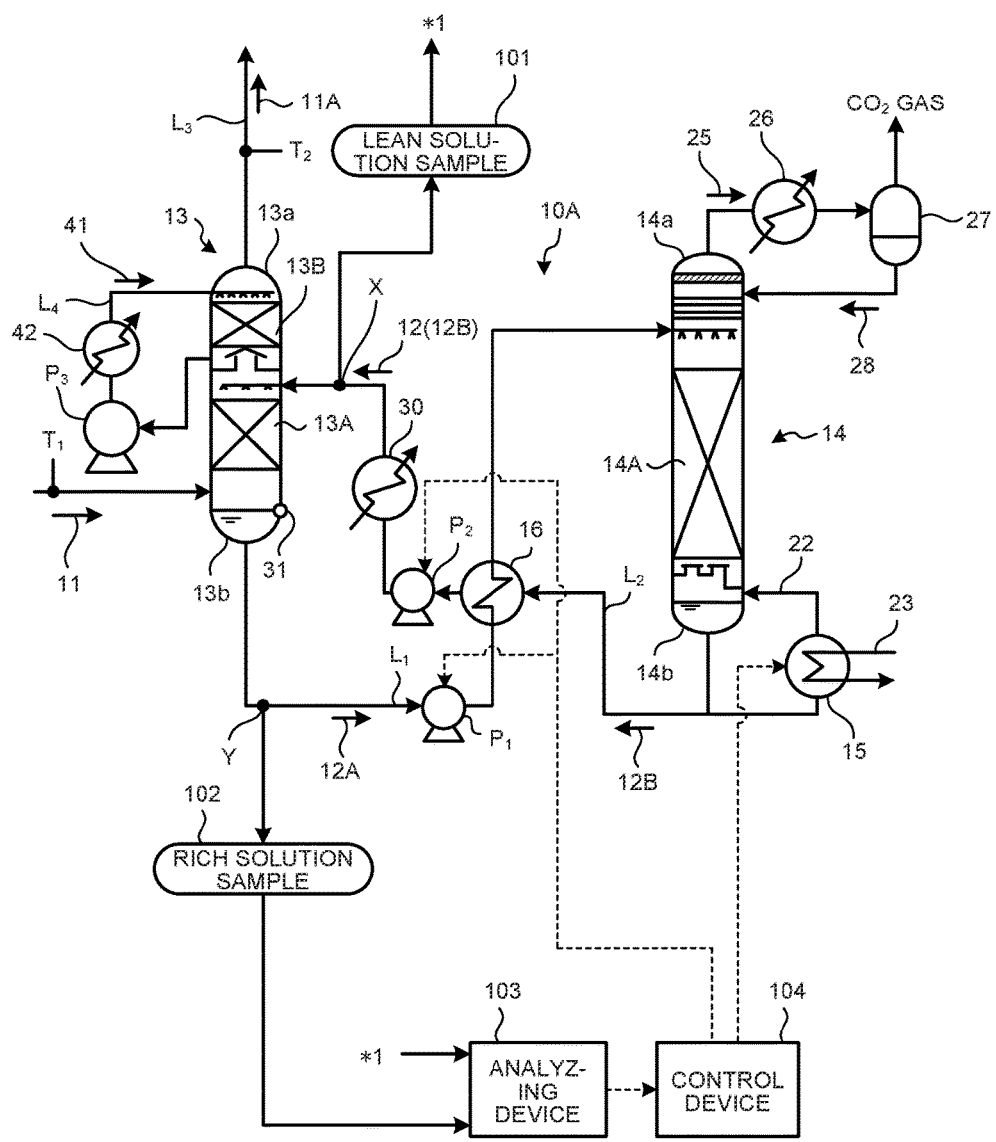
FIG. 1 is a schematic diagram of a gas absorbing and regenerating apparatus according to a first embodiment.

FIG. 1 is a schematic diagram of a gas absorbing and regenerating apparatus according to a first embodiment.
Herein, in this embodiment, boiler flue gas containing $CO_2$ gas as absorbed gas is described as introduced gas.
As illustrated in FIG. 1, a gas absorbing and regenerating apparatus 10A according to this embodiment, which is provided with an absorber 13 which absorbs the $CO_2$ gas from flue gas 11 containing $CO_2$ as the absorbed gas by using an absorbent 12 circulating in a closed system, an absorbent regenerator 14 which releases the $CO_2$ gas from rich solution 12A as an absorbent obtained by absorbing the $CO_2$ gas in the absorber 13, a rich solution supply line $L_1$ which draws off the absorbent obtained by absorbing the $CO_2$ gas in the absorber 13 from a bottom 13b of the absorber 13 as the rich solution 12A and introduces the absorbent to the absorbent regenerator 14, a lean solution supply line $L_2$ which draws off the absorbent regenerated in the absorbent regenerator 14 from a bottom 14b of the absorbent regenerator 14 as lean solution 12B and introduces the absorbent into the absorber 13, a first sampling part X at which a lean solution sample 101 is collected in the vicinity of an inlet for the lean solution supply line $L_2$ in the absorber 13, a second sampling part Y at which a rich solution sample 102 is collected in the vicinity of an outlet for the rich solution supply line $L_1$ in the absorber 13, and an analyzing device 103 which analyzes the collected lean solution sample 101 and rich solution sample 102, collects the lean solution sample 101 and the rich solution sample 102 at the first sampling part X and the second sampling part Y, respectively, in the same time period, measures $CO_2$ concentrations in the lean solution sample 101 and the rich solution sample 102, and controls gas absorbing and regenerating operation based on measured results.

Meanwhile, in this embodiment, a heat exchanger 16 arranged in an intersection of the lean solution supply line $L_2$ and the rich solution supply line $L_1$ to exchange heat of the rich solution 12A and the lean solution 12B is provided; in this system, $CO_2$ is removed by heat of a reboiler 15 in the absorbent regenerator 14 and a regenerated absorbent (lean solution) 12B is reused.

Herein, the absorbent 12 circulates to be reused in the closed system in the gas absorbing and regenerating apparatus 10A; the absorbent is referred to as the rich solution 12A after it absorbs the $CO_2$ gas in the absorber 13 and as the lean solution 12B after it releases $CO_2$ in the absorbent regenerator 14. The absorbent is regenerated by a reclaiming device according to a deterioration status thereof and newly supplied as needed.

In this embodiment, a method for controlling the gas absorbing and regenerating operation by a control device 104 includes controlling a flow rate of the lean solution 12B introduced into the absorber 13 and heat load in a reboiler, for example. Herein, it is also possible to control an operational status of gas absorption/regeneration by executing operation by a worker without using the control device 104 as in this embodiment.

In the gas absorbing and regenerating apparatus 10A of the flue gas containing $CO_2$ (introduced gas) 11, the flue gas is sent to a gas cooling device (not illustrated) before being introduced into the absorber 13, cooled by cooling water there, and introduced into the absorber 13 after temperature thereof is adjusted to a predetermined temperature.

The absorber 13 is provided with a packed bed unit 13A inside thereof, and countercurrent contact efficiency of the introduced gas 11 with the lean solution 12B as the absorbent is improved when the flue gas passes through the packed bed unit 13A. Meanwhile, a plurality of packed bed units may be provided; the introduced gas 11 and the absorbent 12 are brought into countercurrent contact with each other by a spraying method, a liquid column method, a shelf plate method and the like, for example, in addition to a packed bed method.

In the absorber 13, the introduced gas 11 is brought into countercurrent contact with the lean solution 12B as an amine absorbent, and for example, $CO_2$ in the introduced gas 11 is absorbed into the absorbent by a chemical reaction, and then discharge gas 11A obtained by removal of $CO_2$ is released outside the system. Meanwhile, a cleaning unit 13B which cleans the discharge gas 11A with cleaning water 41 is provided in the upper portion of the packed bed 13A (downstream side of gas flow); the cleaning unit cleans the discharge gas to remove the absorbent entrained in the discharge gas 11A to prevent discharge of the absorbent to outside. In the cleaning unit 13B, the cleaning water 41 which circulates in a circulation line $L_4$ is circulated by a circulation pump $P_3$ and is cooled by the cooling water in a heat exchanging unit 42 to clean the discharge gas 11A to be released outside.

The rich solution 12A with a high $CO_2$ concentration into which $CO_2$ is absorbed is supplied to the absorbent regenerator 14 by a rich solvent pump $P_1$ through the rich solution supply line $L_1$, introduced into the regenerator at the vicinity of a top 14a of the absorbent regenerator 14 including a packed bed unit 14A, and releases a large part of $CO_2$ by an endothermic reaction by water vapor 22 indirectly heated by saturated water vapor 23 in the reboiler 15 while flowing down in the absorber to be regenerated.

$CO_2$ gas 25 with the water vapor, released from the rich solution 12A in the regenerator, is derived from the top 14a of the absorbent regenerator 14. The water vapor of the $CO_2$ gas 25 with the water vapor is condensed by a cooling unit 26, and water is separated as condensed water 28 by a separation drum 27, and then the $CO_2$ gas is released outside the system to be recovered. The condensed water 28 separated in the separation drum 27 is supplied to an upper portion and the like of the absorbent regenerator 14 to adjust water balance in the closed system.

The lean solution 12B with a low $CO_2$ concentration regenerated in the absorbent regenerator 14 is cooled by heat exchange with the rich solution 12A by the heat exchanger 16, further cooled by a lean solvent cooler 30 after pressure thereof is raised by a lean solvent pump $P_2$, and thereafter supplied to the absorber 13 again to be circulated and reused as the absorbent.

Herein, in the operation of the gas absorbing and regenerating apparatus 10A which recovers $CO_2$ in the flue gas by using the amine absorbent as the absorbent, the operation to achieve required $CO_2$ absorption performance (recovered amount and absorption rate of $CO_2$) and minimize heat quantity of the saturated water vapor 23 and the like supplied to the reboiler 15 of the absorbent regenerator 14 is desired.

Herein, an amount of $CO_2$ absorbed into the amine absorbent as an absorbing agent is affected by a concentration of the absorbent (anime absorbing agent) in the lean solution 12B and the $CO_2$ concentration in the lean solution 12B introduced into the absorber 13 at the time of absorbing operation.

For example, when the $CO_2$ concentration in the lean solution 12B is high, an absorption rate of $CO_2$ into the amine absorbent decreases as a reaction rate of $CO_2$ with the amine absorbent decreases, so that an efficient absorbing step might be deteriorated in the absorber 13.

When absorption of $CO_2$ decreases, the rich solution 12A is discharged from the absorber 13 with the $CO_2$ concentration in the rich solution 12A being kept low, and the rich solution 12A is introduced into the absorbent regenerator 14 as-is.

As a result, operation to achieve a desired $CO_2$ recovery rate cannot be performed.

That is to say, when an object is to recover 90% of $CO_2$ in the boiler flue gas as the introduced gas 11 in operation to recover a predetermined amount of $CO_2$, the recovery rate of 90% cannot be achieved.

Therefore, in this embodiment, the lean solution sample 101 is collected at the first sampling part X in the vicinity of the inlet for the lean solution supply line $L_2$ in the absorber 13, and in the same time period as this collection, the rich solution sample 102 is collected at the second sampling part Y in the vicinity of the outlet for the rich solution supply line $L_1$ in the absorber 13.

Then, the $CO_2$ concentrations in the lean solution 12B introduced into the absorber 13 and the rich solution 12A are monitored to select an optimal operational condition.

As the optimal operational condition, $CO_2$ in the rich solution 12A is decreased by varying load of the reboiler 15 in the absorbent regenerator 14 and a circulation amount of the absorbent is increased by varying flow rate of the lean solvent pump $P_2$ as adjustment of the circulation amount of the absorbent, for example.

The $CO_2$ concentrations of both the lean solution 12B and the rich solution 12A are monitored at both of the first sampling part X and the second sampling part Y in this manner for the following reason.

The $CO_2$ concentration in the lean solution 12B obtained in the regenerator 14 as a regenerating step of the rich solution 12A is adjusted by the heat quantity of the saturated water vapor 23 and the like supplied to the reboiler 15 of the regenerator 14 under the condition that a property of the rich solution 12A supplied to the regenerator 14 is the same.

The $CO_2$ concentration in the rich solution 12A obtained in the absorber 13 as an absorbing step of the $CO_2$ gas is adjusted by the flow rate of the lean solution 12B supplied to the absorber 13 (circulation amount of absorbent) under the condition that a property of the lean solution 12B supplied to the absorber 13 is the same.

In this manner, it is required to find an optimal combination condition regarding the flow rate of the lean solution 12B in the absorber 13 and a supplied heat flow of the saturated water vapor 23 and the like in the reboiler 15 for setting the optimal operational condition which satisfies both the $CO_2$ absorption performance and reduction in required energy in the gas absorbing and regenerating apparatus 10A, and for this purpose, it is required to figure out the $CO_2$ concentrations in the lean solution 12B and the rich solution 12A in the same time period.

From above, in order to efficiently operate the gas absorbing and regenerating apparatus 10A by an amine method, the lean solution sample 101 at the first sampling part X and the rich solution sample 102 at the second sampling part Y are collected in the same time period, and the concentrations of the absorbent and the $CO_2$ concentrations in the lean solution sample 101 and the rich solution sample 102 are measured, the $CO_2$ concentration in the lean solution 12B at the time of introduction into the absorber 13 (X), the $CO_2$ concentration in the rich solution 12A at the time of discharge from the absorber 13 (Y) and an amine concentration of at least one or both of the lean solution 12B and the rich solution 12A are figured out in the same time period; and the control device 104 executes the control of the flow rate of the lean solution and the heat load in the reboiler, for example, for excellent operation of the gas absorption/regeneration based on the measured results.

According to this, the operation to minimize the heat quantity of the saturated water vapor 23 supplied to the reboiler 15 while maintaining the performance of $CO_2$ recovery from the flue gas 11 becomes possible.

An example of operation control using the gas absorbing and regenerating apparatus 10A in this embodiment is hereinafter described. Meanwhile, hereinafter, percentages of the recovered amount and the absorbent concentration are examples for description; the present invention is not at all limited by them.

First, it is confirmed whether $CO_2$ is recovered in a steady state in the gas absorbing and regenerating apparatus 10A. The flue gas containing $CO_2$ from a boiler and the like is introduced into the absorber 13 as the introduced gas 11.

Herein, when the $CO_2$ concentration in the introduced gas 11 is supposed to be constant (10%, for example), the $CO_2$ recovery rate is set to be 90%. In this case, the $CO_2$ concentration in the discharge gas 11A is 1%. Then, the reboiler load in the reboiler 15 and the circulation amount of the absorbent 12 are determined such that the $CO_2$ recovery rate (recovery rate of 90%) is realized in consideration of performance of the absorbent to be used.

While the operation in the determined steady state is performed, the $CO_2$ recovery rate changes due to the fluctuation in operation load of the boiler and the deterioration of the absorbent due to long-term operation, for example.

Therefore, in this embodiment, the lean solution sample 101 is drawn off at the point X from the lean solution 12B of the absorbent introduced into the absorber 13 to circulate and the analyzing device 103 analyzes the $CO_2$ concentration in the lean solution sample 101. The collected sample is diluted to a predetermined concentration and analyzed by a total organic carbon (TOC) analyzer as the analyzing device 103 to analyze $CO_2$ in the absorbent.

As a result of the analysis, when the $CO_2$ concentration is a predetermined optimal value ($\alpha_0$), the steady operation is continued. The predetermined optimal value ($\alpha_0$) is the $CO_2$ concentration when the lean solution 12B is appropriately introduced into the absorber 13 for achieving the recovery rate of 90%, for example.

On the other hand, when the $CO_2$ concentration is lower than the predetermined optimal value ($\alpha_0$) ($\alpha_1 < \alpha_0$), a reboiler amount of the saturated water vapor 23 in the reboiler 15 of the absorbent regenerator 14 is large and $CO_2$ is wastefully diffused, so that it is considered that the reboiler load is increased.

In such a case, the control device 104 may give an instruction to the reboiler 15 to reduce the load, thereby minimizing the required energy.

When the $CO_2$ concentration is higher than the predetermined optimal value ($\alpha_0$) ($\alpha_2 > \alpha_0$), the $CO_2$ concentration in the lean solution 12B introduced into the absorber 13 is high, so that it is required to increase a supply amount of the saturated water vapor 23 in the reboiler 15 of the absorbent regenerator 14 to diffuse $CO_2$.

At the same time, the control device 104 gives an instruction to one or both of the rich solvent pump $P_1$ and the lean solvent pump $P_2$ to increase the circulation amount, thereby increasing the supply amount of the lean solution 12B to the absorber 13 to recover the $CO_2$ recovery performance.

In the same time period as the collection of the sample at the X point from the lean solution 12B, the rich solution sample 102 is drawn off at the Y point from the rich solution 12A of the absorbent discharged from the absorber 13, and the $CO_2$ concentration of the rich solution sample 102 is analyzed by the analyzing device 103.

As a result of the analysis, when the $CO_2$ concentration in the rich solution 12A is a predetermined optimal value ($\beta_0$), the steady operation is continued. The predetermined optimal value ($\beta_0$) is the $CO_2$ concentration after $CO_2$ is appropriately absorbed in the rich solution 12A in the absorber 13 for achieving the recovery rate of 90%, for example.

On the other hand, when the $CO_2$ concentration is lower than the predetermined optimal value ($\beta_0$) ($\beta_1 < \beta_0$), a $CO_2$ absorption rate in the absorber 13 decreases, so that it is required to perform operation to increase the circulation amount of the absorbent for further absorption of $CO_2$.

In such a case, the control device 104 increases the circulation amounts of the rich solvent pump $P_1$ and the lean solvent pump $P_2$ to maintain the $CO_2$ recovery rate and adjusts the load of the reboiler 15 according to the circulation amount, thereby minimizing the required energy.

The $CO_2$ concentration in the introduced gas 11 increases especially when the boiler load increases. In such a case, the $CO_2$ absorption rate is deteriorated, so that the $CO_2$ recovery rate is improved by increasing the circulation amount.

As a result, according to this embodiment, operation of a process capable of achieving the required absorption performance of the absorbed gas (for example, $CO_2$ recovery rate of 90%) and minimizing the heat quantity of the saturated water vapor 23 and the like supplied to the reboiler 15 of the absorbent regenerator 14 may be performed.

Furthermore, the lean solution sample 101 is drawn off at the point X from the lean solution 12B of the absorbent introduced into the absorber 13 to circulate and the amine concentration in the lean solution sample 101 is analyzed by the analyzing device 103. Herein, the amine concentration is an amount of the amine absorbent as the absorbing agent in the lean solution 12B. The collected sample is diluted to a predetermined concentration to be analyzed by an ion chromatography (IC) analyzer as the analyzing device 103 which analyzes the amine concentration in the absorbent.

As a result of this analysis, when the amine concentration is a predetermined optimal value ($\gamma_0$), the steady operation is continued. The predetermined optimal value ($\gamma_0$) is the concentration (for example, 30%) of the amine absorbing agent which the lean solution 12B appropriately contains for achieving the $CO_2$ recovery rate of 90%, for example.

When the amine concentration is appropriate, the recovery rate is maintained.

When the amine concentration fluctuates from (becomes lower than) the predetermined optimal value ($\gamma_1 < \gamma_0$), temperature of the introduced gas 11 introduced into the absorber 13 and that of the discharge gas 11A are measured by thermometers ($T_1$, $T_2$) depending on the fluctuation, and according to the results, the water balance in the absorber 13, for example, is adjusted by a level meter 31 to adjust the amine concentration. Alternatively, the circulation amount of the absorbent is increased to maintain the $CO_2$ recovery rate of 90%, for example, even when the amine concentration decreases.

For example, when an amount of the introduced gas 11 to be processed fluctuates (boiler load fluctuation) in the absorbing process of a $CO_2$ gas in the boiler flue gas, it is required to secure desired absorption performance by adjusting a circulation flow rate of the absorbing agent; however, residence time of the gas in the absorber 13, that is to say, contact time of the gas and the absorbing agent also changes, so that simple adjustment of the circulation flow rate of the absorbing agent proportional to the gas amount leads not to be optimal. Therefore, it becomes possible to achieve the required absorption performance and minimize the required energy by changing an operational condition of a process in consideration of properties of both the lean solution 12B and the rich solution 12A as in this embodiment.

For example, when the concentration of a $CO_2$ gas component in the introduced gas 11 to be processed fluctuates or when a required removal rate of a $CO_2$ gas component is changed in the $CO_2$ gas absorbing process, a required removal concentration of the $CO_2$ gas component in the discharge gas 11A which passes through the absorber 13 changes, so that it becomes possible to reduce the required energy by appropriately changing the $CO_2$ concentration in the lean solution 12B.

At that time, efficiency in the regenerating step in the regenerator 14 is affected by the $CO_2$ concentration in the rich solution 12A, so that it is required to change the process operational condition within a range in which the $CO_2$ concentration in the rich solution 12A does not deteriorate performance at the regenerating step; in this regard, it is possible to achieve the required absorption performance and minimize the required energy by changing the process operational condition in consideration of the properties of both the lean solution 12B and the rich solution 12A as in this embodiment.

Second Embodiment

Figure 2:
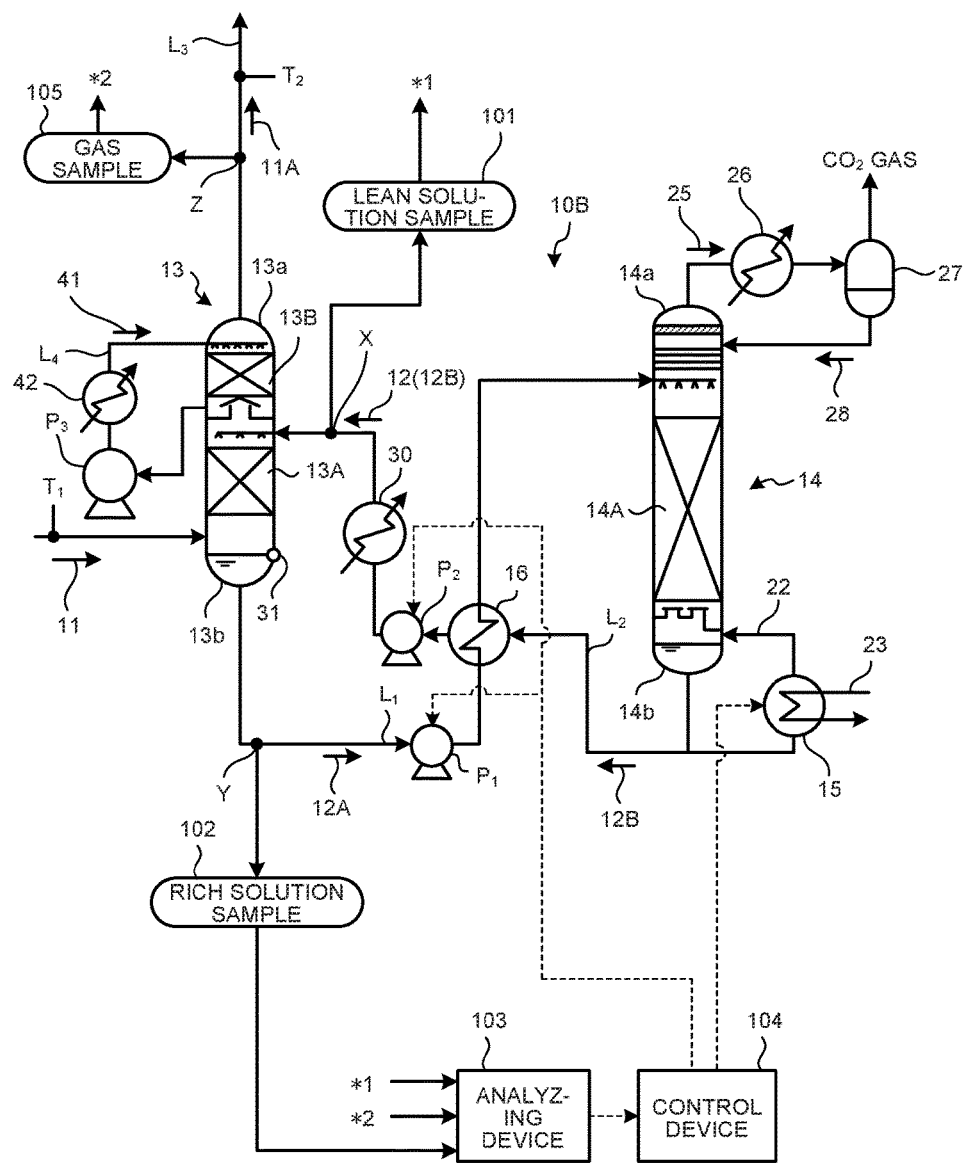
FIG. 2 is a schematic diagram of a gas absorbing and regenerating apparatus according to a second embodiment.

FIG. 2 is a schematic diagram of a gas absorbing and regenerating apparatus according to a second embodiment. The same reference sign is assigned to the same member as that of the device of the first embodiment and the description thereof is not repeated. As illustrated in FIG. 2, a gas absorbing and regenerating apparatus 10B according to this embodiment is further provided with a gas discharge line $L_3$ which discharges discharge gas 11A obtained by removal of absorbed gas from a top 13a of an absorber 13 and a third sampling part Z at which a gas sample 105 is collected in the vicinity of an outlet for the gas discharge line $L_3$ in the absorber 13 in addition to the device of the first embodiment, and the device collects gas at the third sampling part Z in the same time period as collection of a lean solution sample 101 and a rich solution sample 102, and measures a concentration of an absorbent entrained in the discharge gas 11A, and then controls operation to absorb/regenerate gas based on measured results.

The discharge gas 11A is brought into contact with an absorbent 12 in the absorber 13, so that an amine absorbing agent entrains therein. An amine concentration decreases by this entrainment, so that it is required to confirm whether an entrained amount of amine is not larger than a predetermined amount for preventing this.

When the entrained amount of amine is not larger than the predetermined amount, operation is maintained as-is; however, when the entrained amount of amine is not smaller than the predetermined amount, temperature of cleaning water 41 in a cleaning unit 13B is lowered to decrease the entrained amount and a circulation amount of the absorbent 12 circulating in the absorber 12 and the absorbent regenerator 14 and a corresponding heat load in the reboiler are controlled, and operation is performed in a mode to decrease the entrainment of an amine absorbent. In this case also, it is possible to achieve required absorption performance for the absorbed gas and minimize the heat quantity of saturated water vapor 23 and the like supplied to a reboiler 15 of the absorbent regenerator 14 by collecting the lean solution sample 101 at the first sampling part X and the rich solution sample 102 at the second sampling part Y to analyze by an analyzing device 103 as in the first embodiment.

Third Embodiment

Figure 3:
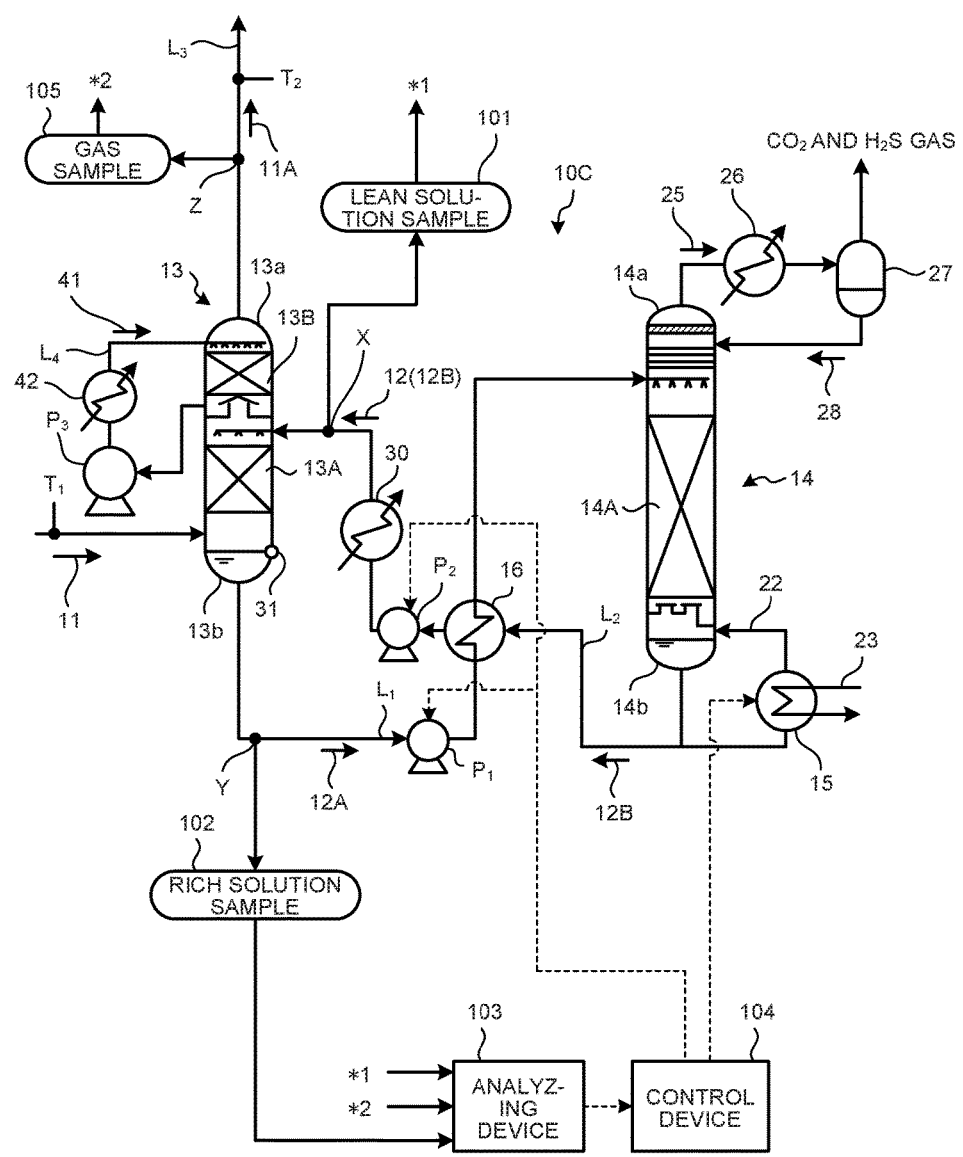
FIG. 3 is a schematic diagram of a gas absorbing and regenerating apparatus according to a third embodiment.

FIG. 3 is a schematic diagram of a gas absorbing and regenerating apparatus according to a third embodiment. In this embodiment, the device is applied to a gas absorbing and regenerating apparatus which removes $H_2S$ contained in coal gasification gas, for example, as introduced gas 11. Meanwhile, a device configuration is the same as that of the first embodiment, so that the same reference sign in the device configuration is assigned and the description thereof is not repeated.

As illustrated in FIG. 3, a gas absorbing and regenerating apparatus 10C according to this embodiment is applied to a gas purifying device which removes a sulfur compound contained in generated gas (gasification gas) from a coal gasification furnace by a reactive absorption and diffusion method using an amine absorbing agent in an IGCC gas purifying device.

$H_2S$ in the gasification gas is removed by the gas purifying device by using an amine absorbent as an absorbent. Meanwhile, $CO_2$ contained in the gasification gas is also removed together with $H_2S$.

Herein, the coal gasification gas which passes through the gas purifying device is supplied for power generation in a gas turbine, so that a $CO_2$ amount simultaneously absorbed when the sulfur compound is removed in the gas purifying device is preferably smaller for inhibiting decrease in supplied gas amount to the gas turbine, that is to say, decrease in power generation efficiency.

Absorption selectivity of the sulfur compound and $CO_2$ in the gas by the gas absorbing and regenerating apparatus 10C as the gas purifying device is affected by a flow rate of lean solution 12B and a gas flow rate supplied to an absorber 13 of the gas absorbing and regenerating apparatus 10C in addition to a property of the lean solution supplied to the gas purifying device including a $CO_2$ concentration, so that it becomes possible to improve selectivity of the sulfur compound with respect to $CO_2$ by optimizing an operational condition of the gas absorbing and regenerating apparatus 10C as in the first embodiment.

Furthermore, in a state in which requirement for a sulfur oxide in the coal gasification gas processed in the gas absorbing and regenerating apparatus 10C is satisfied, when a $CO_2$ concentration in the rich solution 12A is high, it is considered that $CO_2$ is excessively absorbed by the gas purifying device, so that it becomes possible to efficiently generate power by minimizing the amount of absorbed $CO_2$ by adjusting the operational condition of the gas absorbing and regenerating apparatus 10C (circulation flow rate of the absorbing agent and the heat quantity to be input for regenerating the absorbing agent).

In addition, $CO_2$ in the lean solution 12B supplied to the absorber 13 of the gas absorbing and regenerating apparatus 10C might inhibit absorption capacity of the sulfur compound, so that it is required for the $CO_2$ concentration in the lean solution 12B to be monitored not to become excessively high.

Therefore, maintenance of removal performance of sulfur compound is secured by changing the operational condition of the gas absorbing and regenerating apparatus 10C while figuring out the $CO_2$ concentration in the lean solution 12B at the first sampling part X and in the rich solution 12A at the second sampling part Y in the same time period.

In this manner, according to this embodiment, it becomes possible to improve the selectivity of the sulfur compound with respect to $CO_2$ by monitoring the $CO_2$ concentration in the lean solution 12B and in the rich solution 12A within a range in which a monitored concentration regarding the sulfur compound in the introduced gas 11 as the coal gasification gas processed in the absorber 13 satisfies the requirement and adjusting the circulation flow rate of the absorbing agent and the heat quantity to be input for regenerating the absorbing agent such that the operational condition to minimize the absorbed amount of $CO_2$ calculated from difference between the $CO_2$ concentrations and the circulation flow rate of the absorbing agent is obtained in the operation of the gas absorbing and regenerating apparatus.

REFERENCE SIGNS LIST 10A, 10B, 10C Gas Absorbing and Regenerating Apparatus
11 Introduced Gas
12 Absorbent
12A Rich Solution
12B Lean Solution
13 Absorber
14 Absorbent Regenerator (Regenerator)
15 Reboiler
16 Heat Exchanger

The invention claimed is:
1. A gas absorbing and regenerating apparatus, comprising:

an absorption tower which absorbs $CO_2$ gas from introduced gas containing the $CO_2$ gas by using an amine absorbent circulating in a closed system;
an absorbent regeneration tower which releases the $CO_2$ gas from the amine absorbent which absorbs the $CO_2$ gas in the absorption tower;
a rich solution supply line which draws off the amine absorbent which absorbs the $CO_2$ gas in the absorption tower from the absorption tower as rich solution and introduces the amine absorbent into the absorbent regeneration tower;
a lean solution supply line which draws off the amine absorbent regenerated in the absorbent regeneration tower from the absorbent regeneration tower as lean solution and introduces the amine absorbent into the absorption tower;
a first sampling part at which a lean solution sample is collected in the vicinity of an inlet for the lean solution supply line in the absorption tower;
a second sampling part at which a rich solution sample is collected in the vicinity of an outlet for the rich solution supply line in the absorption tower; and
a total organic carbon (TOC) analyzer which analyzes $CO_2$ concentrations in the collected lean solution sample and rich solution sample,
wherein the gas absorbing and regenerating apparatus collects the lean solution sample at the first sampling part and the rich solution sample at the second sampling part, respectively, in the same time period, and measures the concentrations of the $CO_2$ gas in the lean solution sample and the rich solution sample, and then controls a flow rate of the amine absorbent introduced into the absorption tower or heat load in a reboiler based on the measured results.

2. The gas absorbing and regenerating apparatus according to claim 1, comprising:
a packed bed unit which is provided in the absorption tower and in which the introduced gas is brought into countercurrent contact with the amine absorbent;
a gas discharge line which discharges discharge gas obtained by removal of the $CO_2$ gas from a top of the absorption tower;
a cleaning unit which is provided in downstream side of gas flow of the packed bed unit and cleans the discharge gas with a cleaning water; and
a third sampling part at which a gas sample is collected in the vicinity of an outlet for the gas discharge line in the absorption tower;
wherein the gas absorbing/regenerating apparatus collects the gas at the third sampling part in the same time period as the collection of the lean solution sample and the rich solution sample, and measures an amine concentration of the amine absorbent entrained in the discharge gas, and then controls at least one of a temperature of the cleaning water, the flow rate of the amine absorbent introduced into the absorption tower and the heat load in the reboiler based on the measured result.

3. A method for operating a gas absorbing and regenerating apparatus using a gas absorbing and regenerating apparatus comprising:
an absorption tower which absorbs $CO_2$ gas from introduced gas containing the $CO_2$ gas by using an amine absorbent circulating in a closed system;
an absorbent regeneration tower which releases the $CO_2$ gas from the amine absorbent which absorbs the $CO_2$ gas in the absorption tower;
a rich solution supply line which draws off the amine absorbent which absorbs the $CO_2$ gas in the absorption tower from the absorption tower as rich solution and introduces the amine absorbent into the absorbent regeneration tower;
a lean solution supply line which draws off the amine absorbent regenerated in the absorbent regeneration tower from the absorbent regeneration tower as lean solution and introduces the amine absorbent into the absorption tower;
a first sampling part at which a lean solution sample is collected in the vicinity of an inlet for the lean solution supply line in the absorption tower;
a second sampling part at which a rich solution sample is collected in the vicinity of an outlet for the rich solution supply line in the absorption tower; and
a total organic carbon (TOC) analyzer which analyzes $CO_2$ concentrations in the collected lean solution sample and rich solution sample,
wherein the gas absorbing and regenerating apparatus collects the lean solution sample at the first sampling part and the rich solution sample at the second sampling part, respectively, in the same time period, and measures the concentrations of the $CO_2$ gas in the lean solution sample and the rich solution sample, and then controls a flow rate of the amine absorbent introduced into the absorption tower or heat load in a reboiler based on the measured results,
the method comprising, when the introduced gas is boiler flue gas containing $CO_2$, simultaneously figuring out the $CO_2$ concentrations of both the lean solution and the rich solution and an amine concentration of the amine solution of the lean solution, and decreasing the heat load in the reboiler when a $CO_2$ recovery rate by absorption satisfies a predetermined recovery rate.

4. A method for operating a gas absorbing and regenerating apparatus using a gas absorbing and regenerating apparatus comprising:
an absorption tower which absorbs $CO_2$ gas from introduced gas containing the $CO_2$ gas by using an amine absorbent circulating in a closed system;
an absorbent regeneration tower which releases the $CO_2$ gas from the amine absorbent which absorbs the $CO_2$ gas in the absorption tower;
a rich solution supply line which draws off the amine absorbent which absorbs the $CO_2$ gas in the absorption tower from the absorption tower as rich solution and introduces the amine absorbent into the absorbent regeneration tower;
a lean solution supply line which draws off the amine absorbent regenerated in the absorbent regeneration tower from the absorbent regeneration tower as lean solution and introduces the amine absorbent into the absorption tower;
a first sampling part at which a lean solution sample is collected in the vicinity of an inlet for the lean solution supply line in the absorption tower;
a second sampling part at which a rich solution sample is collected in the vicinity of an outlet for the rich solution supply line in the absorption tower; and
a total organic carbon (TOC) analyzer which analyzes $CO_2$ concentrations in the collected lean solution sample and rich solution sample,
wherein the gas absorbing and regenerating apparatus collects the lean solution sample at the first sampling part and the rich solution sample at the second sampling part, respectively, in the same time period, and measures the concentrations of the $CO_2$ gas in the lean solution sample and the rich solution sample, and then controls a flow rate of the amine absorbent introduced into the absorption tower or heat load in a reboiler based on the measured results;

the method comprising, when the introduced gas is gasification gas containing $H_2S$ and $CO_2$, simultaneously figuring out the $CO_2$ concentrations of both the lean solution and the rich solution and an amine concentration of the lean solution, and minimizing an absorbed amount of $CO_2$ when a concentration of $H_2S$ satisfies a predetermined value.

5. The gas absorbing and regenerating apparatus according to claim 1, comprising:

an ion chromatography (IC) analyzer which measures the amine concentration in the lean solution sample at the first sampling part;

wherein the gas absorbing and regenerating apparatus collects a sample in the same time period as the collection of a sample for measuring the $CO_2$ concentrations, and measures the amine concentration, and then adjusts water balance in the absorber or controls circulation amount of the amine absorbent based on the measured results of the amine concentration.

6. The method for operating the gas absorbing and regenerating apparatus according to claim 3, wherein the gas absorbing and regenerating apparatus comprising:

a packed bed unit which is provided in the absorption tower and in which the introduced gas is brought into countercurrent contact with the amine absorbent;

a gas discharge line which discharges discharge gas obtained by removal of the $CO_2$ gas from a top of the absorption tower;

a cleaning unit which is provided in downstream side of gas flow of the packed bed unit and cleans the discharge gas with a cleaning water, and a third sampling part at which a gas sample is collected in the vicinity of an outlet for the gas discharge line in the absorption tower;

wherein the gas absorbing and regenerating apparatus collects the gas at the third sampling part in the same time period as the collection of the lean solution sample and the rich solution sample, and measures an amine concentration of the amine absorbent entrained in the discharge gas, and then controls at least one of a temperature of the cleaning water, the flow rate of the amine absorbent introduced into the absorption tower and the heat load in the reboiler based on the measured result.

7. The method for operating the gas absorbing and regenerating apparatus according to claim 4, wherein the gas absorbing and regenerating apparatus comprising:

a packed bed unit which is provided in the absorption tower and in which the introduced gas is brought into countercurrent contact with the amine absorbent;

a gas discharge line which discharges discharge gas obtained by removal of the $CO_2$ gas from a top of the absorption tower;

a cleaning unit which is provided in downstream side of gas flow of the packed bed unit and cleans the discharge gas with a cleaning water; and a third sampling part at which a gas sample is collected in the vicinity of an outlet for the gas discharge line in the absorption tower;

wherein the gas absorbing and regenerating apparatus collects the gas at the third sampling part in the same time period as the collection of the lean solution sample and the rich solution sample, and measures an amine concentration of the amine absorbent entrained in the discharge gas, and then controls at least one of a temperature of the cleaning water, the flow rate of the amine absorbent introduced into the absorption tower and the heat load in the reboiler based on the measured result.

8. The gas absorbing and regenerating apparatus according to claim 2, comprising:

an ion chromatography (IC) analyzer which measures the amine concentration in the lean solution sample at the first sampling part;

wherein the gas absorbing and regenerating apparatus collects a sample in the same time period as the collection of a sample for measuring the $CO_2$ concentrations, and measures the amine concentration, and then adjusts water balance in the absorber or controls circulation amount of the amine absorbent based on the measured results of the amine concentration.

* * * * *